United States Patent
Schierling

(10) Patent No.: US 6,914,397 B2
(45) Date of Patent: Jul. 5, 2005

(54) REDUCTION OF INTERFERENCE CURRENTS IN A GROUP OF SYNCHRONIZED, VARIABLE SPEED ELECTRIC DRIVES

(75) Inventor: Hubert Schierling, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 105 days.

(21) Appl. No.: 10/365,306

(22) Filed: Feb. 12, 2003

(65) Prior Publication Data

US 2003/0155874 A1 Aug. 21, 2003

(30) Foreign Application Priority Data

Feb. 15, 2002 (DE) .......................... 102 06 395

(51) Int. Cl.[7] .............................. H02P 5/46; H02P 7/68; G05B 11/01
(52) U.S. Cl. ......................................... 318/85; 318/629
(58) Field of Search ................................. 363/149, 150, 363/155, 156; 318/629, 606–608, 625, 654, 655, 85; 361/23, 15, 17, 281, 601, 679, 721, 720, 722

(56) References Cited

U.S. PATENT DOCUMENTS 4,308,465 A * 12/1981 Lafuze ........................ 307/87
4,825,144 A * 4/1989 Alberkrack et al. ........ 323/272
5,142,468 A * 8/1992 Nerem ......................... 363/71
6,486,632 B2 * 11/2002 Okushima et al. .......... 318/599
6,680,591 B1 * 1/2004 Knutson et al. ............. 318/114
2003/0071004 A1 * 4/2003 Higgins ....................... 212/292

FOREIGN PATENT DOCUMENTS

| DE | 197 23 956 A1 | 12/1998 | | |
| EP | 0 266 598 A2 | 5/1988 | | |
| JP | 10290574 A | 10/1998 | | |
| JP | 2000078850 A | * 3/2000 | ............ | H02M/7/48 |
| JP | 2002051566 A | * 2/2002 | ............ | H02M/7/48 |

\* cited by examiner

Primary Examiner—David Martin
Assistant Examiner—Patrick Miller
(74) Attorney, Agent, or Firm—Henry M. Feiereisen

(57) ABSTRACT

The simultaneous generation of interference currents with the same polarity is prevented in all converters of connected drives, without adversely affecting the time slice synchronization or the uniformity of the dynamic characteristics. This is achieved by taking advantage of the symmetry of the modulation. The triangles of the sinusoidal/triangular modulation do not overlap as in conventional drives; instead, the triangles of one group, corresponding to approximately half the number of drives, are offset by 180°. With control processes operating with phasor modulation, the offset of 180° represents a shift of the switching sequence by interchanging the initial zero phasors and/or the modulation half intervals.

12 Claims, 3 Drawing Sheets

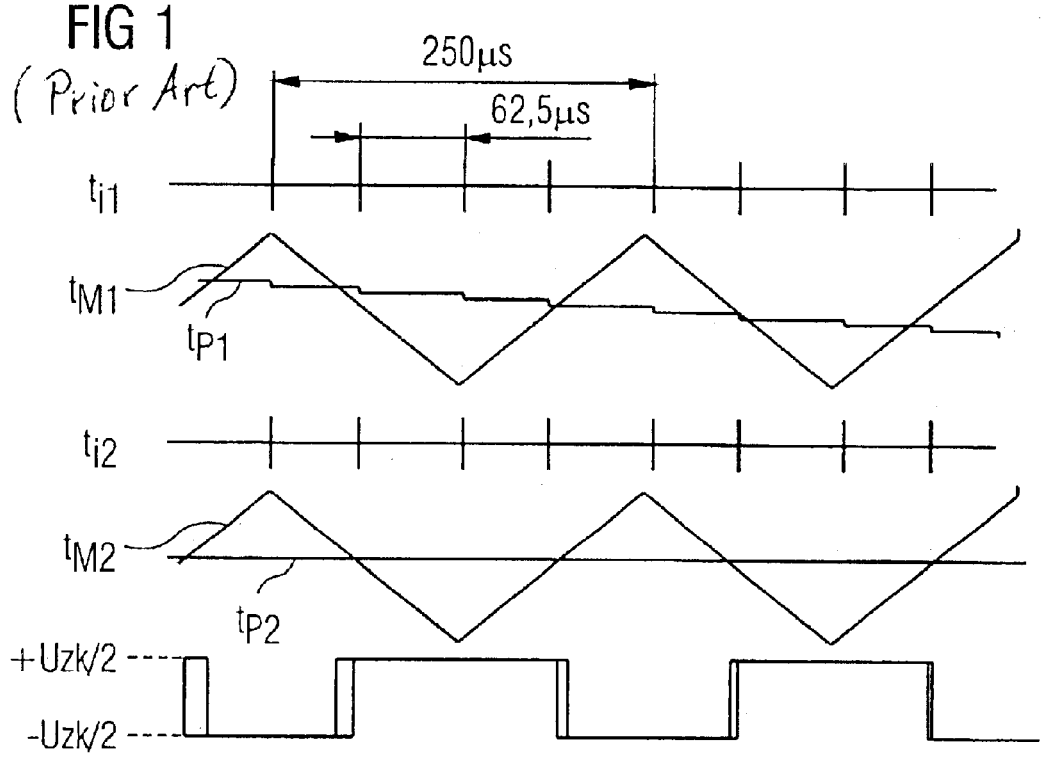
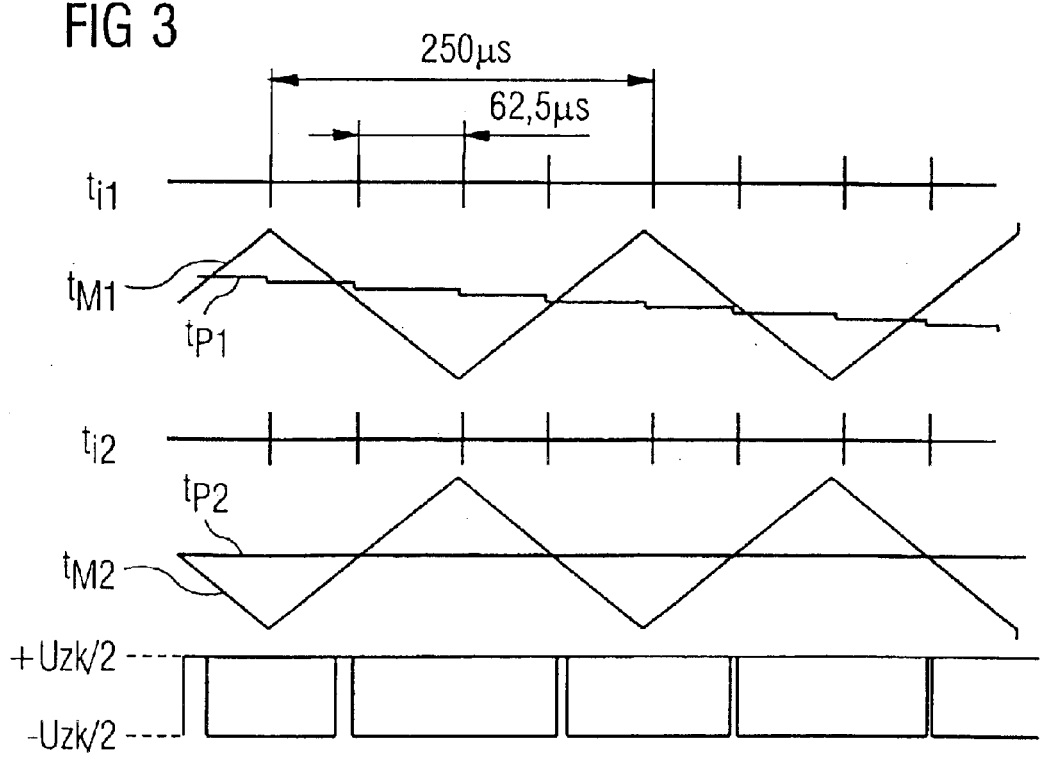

| PHASOR ("normal") | PHASOR (Shifted by 180°) |
|---|---|
| 0−<br>I<br>II　} Modulations-<br>0+　} Halfintervall<br>0+<br>II<br>I<br>0− | 0+<br>II<br>I<br>0−<br>0−<br>I<br>II<br>0+ |

REDUCTION OF INTERFERENCE CURRENTS IN A GROUP OF SYNCHRONIZED, VARIABLE SPEED ELECTRIC DRIVES

CROSS-REFERENCES TO RELATED APPLICATIONS

This application claims the priority of German Patent Application, Serial No. 102 06 395.8, filed Feb. 15, 2002, pursuant to 35 U.S.C. 119(a)–(d), the disclosure of which is incorporated herein by reference.

BACKGROUND OF THE INVENTION

The present invention relates to electric drives and, more particularly, to connected variable speed electric drives, which are controlled through frequency inverters with a common network feed.

In electrical drive systems, e.g. servo-drive systems, where several drives cooperate to produce a common coordinated movement, the control time slices of all drives are usually synchronized, i.e., they start in all drives at the same time. This is necessary so that the actual values (or each actual value) of all drives are determined at the same time and that corresponding adjusting commands are transmitted and implemented at the same time. This time slice synchronization involves all automatic control loops, from the position controller to the current controller.

To achieve the highest possible dynamics, a defined, constant dead time and an alias-free determination of the actual current value, the current control frequency and the duration of the control pulse of the converter are almost always synchronized in a variable speed drive, i.e. switching frequency and sampling rate are identical or have an integer ratio. The German published patent application DE 19723956 A1 describes an exemplary digital multi-axis control for controlling real time processes. Several decentralized drive instances are synchronized on a central control instance, whereby required system states and actual values can be stored at synchronous and equidistant times in a timing pattern of the corresponding instance, so that the assigned system states and measured values can be independently accessed at any time. Typically, the only exception from this rule are converters with a very low switching frequency and/or control processes with optimized pulse patterns, which however are not commonly used in servo applications.

FIG. 1 shows this relationship for two exemplary conventional drives with a converter sampling rate of 16 kHz and a switching frequency of 4 kHz. The control set utilizes a sinusoidal/triangular modulation. The upper portion of FIG. 1 shows the current controller clock $t_{i1}$, an exemplary curve $t_{p1}$ of the desired value of a phase voltage as well as the associated modulation triangle $t_{m1}$ for the first drive as a function of time. The lower portion of FIG. 1 shows the same quantities $t_{i2}$, $t_{m2}$ and $t_{p2}$ for the second drive.

In order to match the reaction rate of all drives as best as possible, the triangles of all drives in the system are synchronized, i.e. overlap temporally. The bottom portion of FIG. 1 shows the time dependence of the potentials of two inverter phases, drive 1 and drive 2, which essentially overlap and oscillate between half the positive and half the negative intermediate circuit voltage +Uzk/2 and −Uzk/2.

In control processes operating with space-division modulation, this corresponds to the synchronization of the modulation intervals (see FIG. 4 below).

When drives are connected in a servo system via frequency converters, all drives usually have a common intermediate circuit and a common power line feed. A line filter can also be part of the power line feed. The line filter typically includes a current-compensated choke, which can be quite expensive. In a current-compensated choke, the three windings of the three strands are wound with the same winding sense around a leg of the choke such that the corresponding fluxes cancel each other, when the sum of the currents is equal to zero. The choke represents high impedance for asymmetric currents, where the sum of the currents not equal to zero.

FIG. 2 shows the emergence of asymmetric interference currents in such systems and the effect of the line filter. A power line 1 supplies a three-phase voltage to an input stage 3 through a line filter 2. The input stage 3 is connected with an inverter 5 (WR) via an intermediate voltage circuit 4. Each phase is connected between the line filter 2 and the input stage 3 via a capacitor to ground potential. A motor 7 is connected to the inverter via an motor line 6. The motor 7 and the converters are grounded. Both the motor line 6 and the motor 7 have parasitic capacitances 9 to ground. The power line 1 and converters have parasitic impedances 9.

The triggering event is in each case a switching process in an inverter. For example, when an inverter phase makes a transition from a negative intermediate circuit potential to positive intermediate circuit potential, the charge of the parasitic capacitances 8 to ground in the cable 6 and in the motor 7 is reversed. A portion of the charge exchange current flows back via the cable shield to the converter, another portion returns via ground into the power line 1 and via the power line terminal to the converter.

The latter current path causes voltage drops across the impedances of the power line. These interference voltages can cause instabilities at other users. The current-compensated choke is intended to block the charge exchange currents flowing through the power line. The existing charge exchange currents then essentially return to the converter only via the ground connection of the converter, and hence do no longer produce interference voltages.

The magnetic part of the choke is sized according to the amplitude of the produced asymmetric interference currents. If the interference current becomes too large, the choke saturates, causing the electromagnetic interference to increase drastically.

The interference current of an inverter WR is particularly large, if the degree of modulation is very small, because the three inverter phases have the same direction and change the potential almost simultaneously, thus producing charge exchange currents with the same polarity. This situation arises with servo drives near a rotation speed of zero, which reflects an operating condition that is quite common in such drives.

With the time slice synchronization described above with reference to FIG. 1, the charge exchange currents of all drives in a servo system, which operate near a rotation speed of zero, are synchronized. In the worst case, the maximum interference current in the system is identical to the sum of the interference currents of the individual drives.

Conventionally, this problem is addressed by designing the line filter for the worst case scenario.

It would therefore be desirable and advantageous to overcome the fundamental problem of asymmetric interference currents in a group of electric drives, without impairing the synchronization of these drives.

SUMMARY OF THE INVENTION

The invention is directed to electric drives and, more particularly to connected variable speed electric drives, which are controlled through frequency inverters with a common power line (line feed).

According to one aspect of the invention, a method for reducing interference currents in connected synchronized, variable-speed electric drives includes the steps of addressing the connected drives with a common frequency converter having a common line feed and a common intermediate circuit as well as associated inverters, or with separate associated frequency converters, selecting switching frequencies of the inverters and respective sampling rates for determining actual values which are identical or integral multiples of each other, and preventing a simultaneous generation of interference currents with identical polarity in all inverters by using a modulation symmetry of voltage phasors, without impairing the synchronization of the dynamic characteristics.

According to another feature of the present invention, the connected drives can be divided into at least two groups having different synchronization modes of the control set and the drives in the at least two groups can be addressed according to the different synchronization modes. Advantageously, the connected drives can be divided into exactly two groups, wherein the two groups are addressed using synchronization modes of the control set that are shifted by 180°.

If the sinusoidal/triangular modulation is produced by phasors, one group of drives can be addressed using temporally synchronous modulation triangles, whereas the second group of drives can be addressed using modulation triangles which are phase-shifted by 180°. If the voltage phasors are modulated, then one group of drives can be addressed by using initial zero phasors that are interchanged with respect to the zero phasors of the second group of drives. Alternatively, one group of drives can be addressed using modulation half intervals that are interchanged with respect to the modulation half intervals of the second group of drives.

The synchronization mode of the control set can advantageously be assigned to a drive automatically at random when the drive is switched on. Alternatively, the control can also be assigned to a drive automatically at random when the drive starts up.

Advantageously, the connected drives can be divided into at least two groups so as to uniformly distribute the different synchronization modes.

According to another advantageous feature, the connected drives can be divided into the two or more groups to make the sum of the capacitances of the groups to ground equal. The connected drives can hereby be divided into the two or more groups based on engine power and/or length of the electrical connecting line.

According to another advantageous feature, the connected drives can be divided into the two or more groups by a supervisory control. Moreover, only those connected drives currently operating at a low rotation speed or modulation level can be associated with the groups.

According to yet another feature, the aforedescribed method can be applied to a servo-drive system with corresponding two-axes modules, wherein a control assembly can be assigned to each of the two-axes modules, which the control assembly controlling the two axes with different synchronization modes of the control set.

In summary, the simultaneous generation of interference currents with the same polarity in all converters can be eliminated, in particular by taking advantage of the symmetry of the modulation, without harming the time slice synchronization or the uniformity of the dynamic characteristics. The triangles of the sinusoidal/triangular modulation in all drives do not all overlap, like with conventional drives, but are shifted in one group of the drives by 180°.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1 shows a time diagram of a conventional synchronization between current controls and control sets for two drives.

FIG. 3 shows a temporal diagram of synchronization according to invention between current controls and control sets with two drives;

DETAILED DESCRIPTION OF PREFERRED EMBODIMENTS

Figure 2:
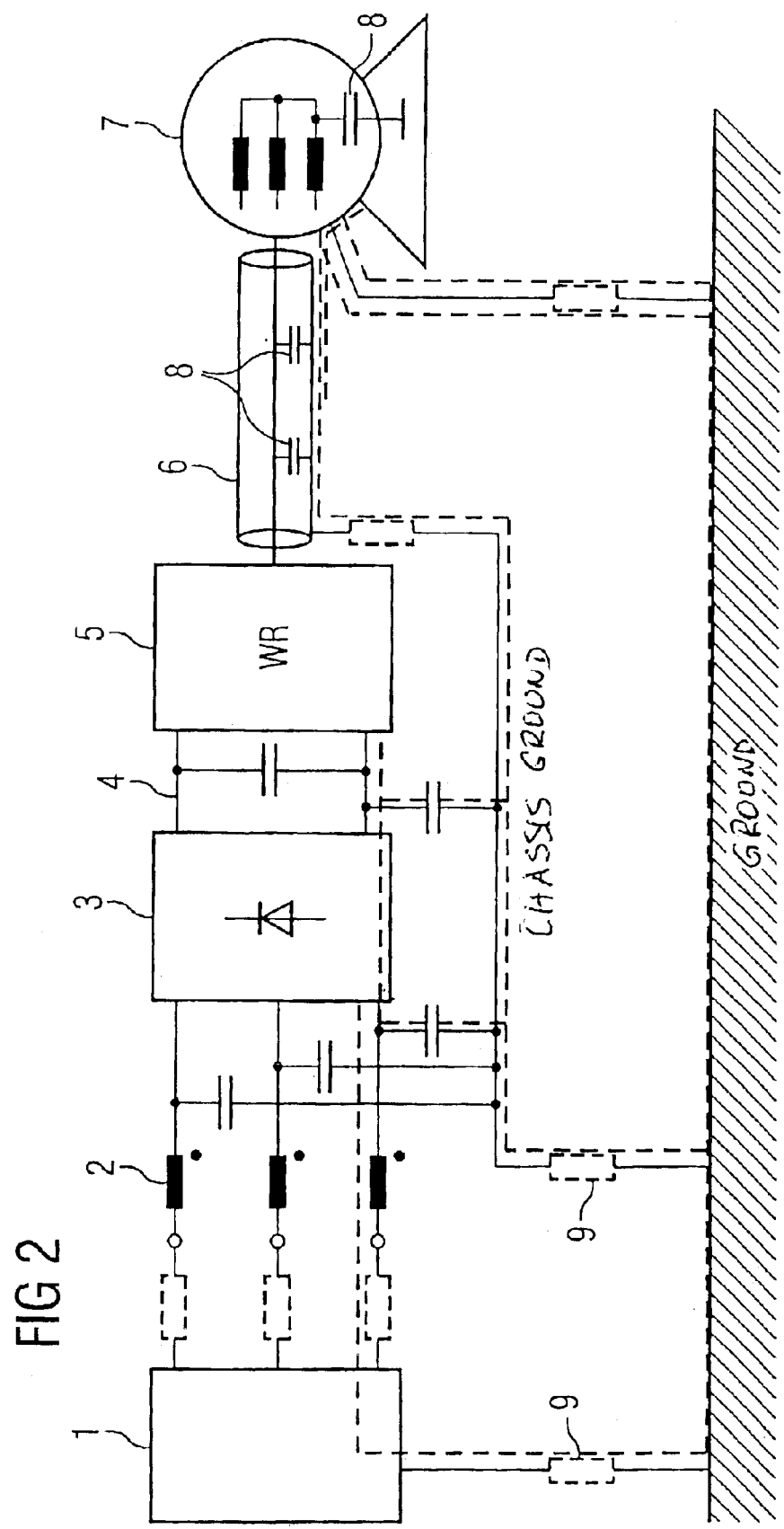
FIG. 2 is a schematic circuit diagram of a drive with exemplary paths for undesirable charge exchange currents.

Throughout all the Figures, same or corresponding elements are generally indicated by same reference numerals. These depicted embodiments are to be understood as illustrative of the invention and not as limiting in any way.

According to one disclosed feature, the time slices of the drives in a drive group are synchronized so that one group of the drives uses a temporally synchronous modulation triangle, whereas a second group uses a modulation triangle that is shifted relative to the first group by 180°. A comparable pattern can be used with other modulation schemes.

Turning now to the drawing, and in particular to FIG. 3, there is shown, like in the prior art FIGS. 1 and 2 described above, a current control clock $t_{i1}$ an exemplary curve $t_{p1}$ of the desired value of a phase voltage, and the corresponding modulation triangle $t_{m1}$ for the first drive, and the corresponding quantities $t_{i2}$, $t_{p2}$, and $t_{m2}$ for the second drive. The triangles of the sinusoidal/triangular modulation $t_{m1}$ and $t_{m2}$ do no longer overlap for all drives, but are shifted for one group of drives by 180°. Accordingly, the modulation $t_{m1}$ is phase-shifted relative to $t_{m2}$ by 180°.

Shifting the modulation triangle by 180° has practically no effect on the chained motor voltage and thus on the motor characteristic. However, the sign of the charge exchange currents of the parasitic capacitances 8 to ground changes for small modulation levels.

In the particularly critical situation described above (modulation level of zero for all drives), the two groups of drives produce charge exchange currents with opposite polarity. Therefore, the interference currents are no longer added, but cancel each other at least partially (provided that the capacitances to ground are similar for all drives). Unlike in FIG. 1, the two potential curves for an inverter phase of drive 1 and an inverter phase of drive 2 then no longer overlap, but are approximately "interleaved", producing a comparatively uniform voltage level between half the positive and half the negative intermediate circuit voltages +Uzk/2 and −Uzk/2.

The theoretical "worst case" for the interference current now occurs when all drives in one group that have an offset triangle operate at a high rotation speed (and hence produce statistically distributed interference currents), and all drives of the other group operate at zero rotation speed. However, even in this very unlikely situation, the interference current only half as large as in the conventional "worst case" scenario.

Figures 4, 5:
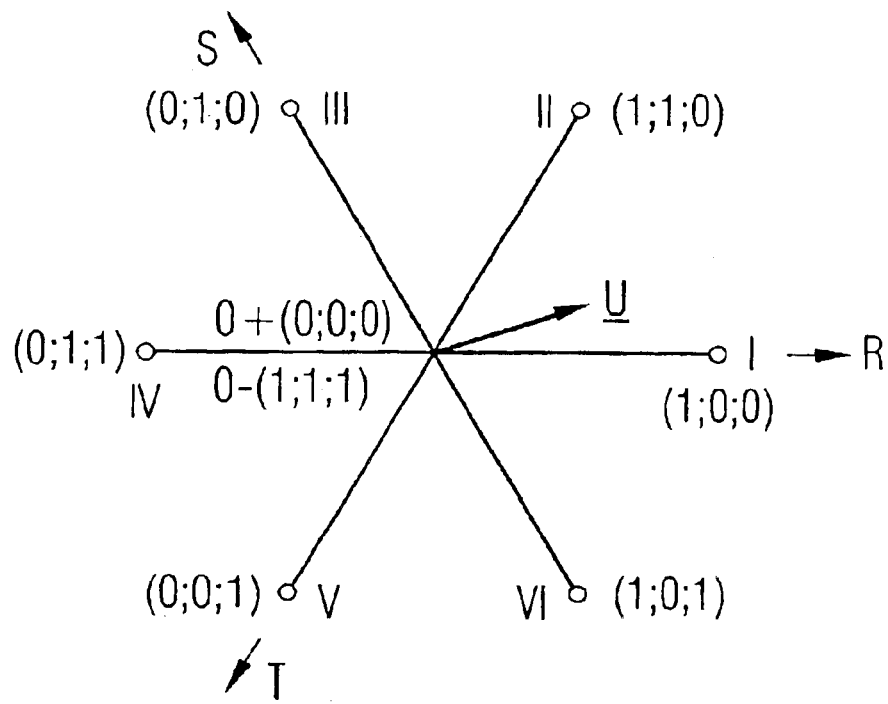
FIG. 4 shows a phasor diagram of the realizable voltage phasors of a pulse converter and associated switching status.
FIG. 5 shows two possible switching sequences for the desired voltage value U shown in FIG. 4, one sequence with "normal" phasor (left), and the other sequence with phasors shifted by 180° (right).

In control processes operating with phasor modulation, the offset by 180° represents a shift of the switching sequence by interchanging the initial zero phasors and/or interchanging the modulation half intervals. FIG. 4 shows schematically the principle of the phasor modulation with reference to voltage phasors for a pulse converter and the associated switching status.

Each switching status I to VI can be described by the three switching commands for the three inverter phases R, S, T. For example, the instruction (1;0;0) indicates that the upper current valve of the inverter in a bridge configuration is activated in phase R, whereas the corresponding lower current valve is activated in the phases S and T. 0+ and 0− designate zero pointers.

A mean value of the desired voltage value U is approximated within a modulation half interval by the neighboring realizable switching status (here I, II, and 0+/0−). The switching sequence is selected so that each change requires only one switching action. FIG. 5 shows two possible switching sequences for the regulated voltage value U shown in FIG. 4, once with "normal" phasors (left) and then with phasors shifted by 180° (right). A modulation half interval is defined by four corresponding switching sequences from one zero phasor 0+/0− to the next.

A modulation half interval corresponds thereby to the flank of a triangle in the sinusoidal/triangular modulation depicted in FIGS. 1 and 3.

Various advantageous embodiments of the invention can be realized with the process of the invention, which will be briefly outlined below.

The drives can be distributed over two groups with different synchronization modes of the control set in different ways:

The mode of the control set can be automatically set at random by each drive upon activation or preferably during start-up.

Servo systems frequently use so-called two-axes modules. In these drives, a control assembly controls two axes. The controller could modulate one of the two axes automatically with a modulation triangle that is offset from the other axis, as shown in FIG. 3.

The mode of the control set can be derived from the bus address of the control assembly (e.g. an odd-numbered address indicates a shifted control set).

The mode of the control set can be a parameter (or a control bit in a parameter) of the drive, wherein the parameter is set by a supervisory control (not shown) so that the two modes are distributed as uniformly as possible. The groups can preferably be selected (advantageously as a function of motor power and line length) so that the sum of the capacitances to ground is identical for the two groups.

The mode of the control set can be set by the supervisory control so that all drives running at a low rotation speed or modulation level are distributed over two groups (as a function of motor power and line length) that the sum of the capacitances to ground is identical for the two groups. In this case, however, a change in the synchronization mode must be permitted during operation.

The drives can also be distributed over more than two groups, although this configuration is substantially more complex and less effective than two groups.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

What is claimed is:

1. A method for reducing interference currents in connected synchronized, variable-speed electric drives, comprising the steps of:

dividing the connected drives into two groups receiving control signals that represent different synchronization modes and are shifted by 180°, addressing the connected drives according to the different synchronization modes with a common freguency converter having a common line feed and a common intermediate circuit as well as associated inverters, selecting, for determining actual current values, switching frequencies of the inverters and respective sampling rates that are identical or integral multiples of each other, and preventing a simultaneous generation of interference currents with identical polarity in all inverters by using a modulation symmetry of voltage phasors.

2. The method of claim 1, wherein the voltage phasors effect a sinusoidal/triangular modulation and one group of drives is addressed using temporally synchronous modulation triangles, whereas the second group of drives is addressed using modulation triangles phase-shifted by 180°.

3. The method of claim 1, wherein the voltage phasors are modulated, and wherein one group or drives is addressed using initial zero phasors that are interchanged with respect to the zero phasors of the second group of drives.

4. The method of claim 1, wherein the voltage phasors are modulated, and wherein one group of drives is addressed using modulation half intervals that are interchanged with respect to the modulation half intervals of the second group of drives.

5. The method of claim 1, wherein a control signal representing one of the different synchronization modes is automatically assigned at random to a drive when the drive is switched on.

6. The method of claim 1, wherein a control signal representing one of the different synchronization modes is automatically assigned at random to a drive when the drive starts up.

7. The method of claim 1, wherein the connected drives are divided into the two groups so as to uniformly distribute the different synchronization modes.

8. The method of claim 7, wherein the connected drives are divided into the two groups by a supervisory control.

9. The method of claim 8, wherein only those connected drives currently operating at a low rotation speed or modulation level are associated with the groups.

10. The method of claim 1, wherein the connected drives are divided into the two groups so that the sum of the capacitances of the groups to ground is equal.

11. The method of claim 1, wherein the connected drives are divided into the two groups based on at least one of engine power and line length.

12. The method of claim 1, as applied to a servo-drive system with corresponding two-axes modules, wherein a control assembly is assigned to each two-axes module, which the control assembly controlling the two axes with control signals representing the different synchronization modes.

* * * * *